United States Patent [19]

Tellis

[11] 4,296,078
[45] Oct. 20, 1981

[54] SEPARATION OF HYDROGEN CHLORIDE FROM GASEOUS MIXTURES

[76] Inventor: Cyril B. Tellis, 818 Beaumont Rd., Charleston, W. Va. 25314

[21] Appl. No.: 194,775

[22] Filed: Oct. 7, 1980

[51] Int. Cl.$^3$ ............................................. B01D 53/34
[52] U.S. Cl. .................................. 423/240; 423/243; 423/488; 55/71
[58] Field of Search ................... 423/240, 240 S, 488; 55/71

[56] References Cited

U.S. PATENT DOCUMENTS

| | | | |
|---|---|---|---|
| 3,876,395 | 4/1975 | Cotter et al. | 55/73 |
| 3,917,469 | 11/1975 | Cotter et al. | 55/73 |
| 3,935,295 | 1/1976 | LaHue et al. | 423/240 |
| 3,959,440 | 5/1976 | Mizuno et al. | 423/239 |
| 3,959,441 | 5/1976 | Furuta et al. | 423/242 |
| 3,962,405 | 6/1976 | Annesser et al. | 423/242 |
| 3,969,482 | 7/1976 | Teller | 423/235 |
| 3,969,492 | 7/1976 | Witte et al. | 423/574 L |
| 3,980,759 | 9/1976 | Henderson et al. | 423/539 |
| 4,003,848 | 1/1977 | Cotter et al. | 252/427 |

Primary Examiner—Earl C. Thomas

[57] ABSTRACT

A method is disclosed for separating hydrogen chloride from a gaseous mixture containing hydrogen chloride and carbon dioxide in admixture with other gaseous impurities comprising contacting said gaseous mixture with a cross-linked, water-soluble polymer of N-glycidylpiperazine at a temperature between about −10° and 100° C.

3 Claims, No Drawings

SEPARATION OF HYDROGEN CHLORIDE FROM GASEOUS MIXTURES

The present invention relates to the selective separation of hydrogen chloride from gaseous mixtures and, more particularly, to such separation of hydrogen chloride by adsorption from admixture with carbon dioxide and other gases and where the predominant gas is a hydrocarbon and the mixture may contain other gaseous impurities.

The removal of hydrogen chloride is of primary interest in the cleanup of stack gas effluent from power plants. The major component of this effluent is carbon dioxide. However, depending on the nature and source of the fuel used, stack gases also contain hydrogen chloride with sulfur and nitrogen compounds, and similar impurities. It is usually necessary to reduce all of these species to substantially low levels to meet air quality guidelines; however, carbon dioxide is an inert and may be allowed to remain in the effluent gas. Thus, a means of removing hydrogen chloride, sulfur compounds, and nitrogen compounds, while excluding carbon dioxide is very necessary. It would be quite advantageous if the method utilized an absorbent or adsorbent which is easily regenerable.

The literature of stack gas cleanup is quite extensive. Only a brief discussion is provided here to highlight the methods used.

Hydrogen chloride may be removed from gas streams by scrubbing with water. However, the resultant aqueous solution is extremely corrosive. Alternatively, non-regenerable "chloride guards" are available commercially. These usually have sodium or calcium oxide as the reactive adsorbent. While effective for hydrogen chloride, they are usually not selective and may be regenerated with difficulty by calcining the spent adsorbent at high temperatures.

High concentrations of hydrogen chloride are removed from gas streams by absorption in water. More recently, solid reactive adsorbents have been developed having as their active constituent sodium oxide or calcium oxide. These "chloride guards" are not selective for hydrogen chloride, i.e., other impurities may also be removed; furthermore, they are not usually regenerable. Thus, in the process of U.S. Pat. No. 3,935,295, a mixture of zinc oxide and calcium oxide (or calcium hydroxide) is used to eliminate low concentrations of hydrogen chloride and organic chlorides from a hydrocarbon containing fluid stream. Reactive adsorption takes place at 150° to 500° C. and the adsorbent is usually not regenerated.

In the process of U.S. Pat. No. 3,969,482, a slurry of a basic material such as the oxide or hydroxide of alkali or alkaline earth metals, is used as a reactive absorbent. It is sprayed into a gas containing acidic impurities. Removal of 60–95% of these components is accomplished by reaction with the basic absorbent. Selection of the latter depends on the nature of the acidic impurity. If this is hydrogen chloride, the absorbent is calcium hydroxide and the formed calcium chloride may be recovered and sold as a by-product. If the impurity is sulfur dioxide, magnesium sulfite is the product of reaction. Regeneration may be accomplished by heating magnesium sulfite above its decomposition temperature to give sulfur dioxide (which is recovered as elemental sulfur in further processing), and magnesium oxide; the latter is recycled as a basic component of the slurry. If both of the above acidic impurities are present in the gas, the regeneration or recovery steps would be more involved. Also, further processing of this partially purified gas is usually necessary to meet acceptable emission standards.

In its broadest sense the present invention entails passing a gas containing carbon dioxide, hydrogen chloride and other impurities over a fixed bed of the solid absorbent to remove primarily hydrogen chloride. For power plant stack gas cleanup the effluent gas containing carbon dioxide, but relatively free of hydrogen chloride, may meet emission standards. In other gas purification further treatment of the effluent gas may be necessary.

The present invention provides the selective adsorption of hydrogen chloride by passage of the gas mixture containing it over a cross-linked polymer of N-glycidylpiperazine. This adsorbent is capable of the selective removal of hydrogen chloride in a process having a relatively wide temperature range of from about $-10°$ to $100°$ C., the lower-intermediate temperatures being preferred, ambient temperature being most preferred for ease of operability. It has been found that adsorption occurs at substantially all pressures prevalent in present gas processing, practice being favored at higher pressures. Under the conditions of the practical application of the process of the invention in stack gas cleanup, hydrogen chloride, as well as sulfur dioxide, is removed selectively while relatively inert carbon dioxide is unaffected. Also unaffected are the selected removal of most of the other common impurity gases encountered in many industrial gas streams such as: hydrogen sulfide, carbonyl sulfide, hydrogen cyanide, nitric acid, mercaptans, hydrogen, carbon monoxide, synthesis gas, air, nitrogen, oxygen, helium, argon, mono-olefins having from 2 to 5 carbon atoms per molecule, diolefins having 4 to 5 carbon atoms per molecule, lower paraffins and acetylenes.

N-glycidylpiperazine has a certain capacity (defined as the amount of impurity adsorbed at breakthrough, i.e., when adsorbent regeneration is needed) determined by the concentration of impurity species in the gas to be purified. This is the case because adsorption is a transient process, with progressive depletion of the adsorbent with time. When the concentration of impurity in the effluent gas is above the acceptable level (breakthrough), it is necessary go regenerate the adsorbent. Regeneration may be carried out by reducing the pressure on the adsorbent bed and purging with a hot inert gas, such as nitrogen, or stripping with steam.

Most of the processes in the prior art involve liquid or slurry absorbents. This results in significant processing requirements both for absorption as well as regeneration. Waste disposal is often necessary. In comparison, the adsorbent of the invention described here is a solid which is contained in a fixed bed through which the gas to be purified is passed. No slurry handling is necessary. Furthermore, regeneration is equally simple, requiring merely that a purge gas be passed through the bed at a temperature above that of the adsorption step. The regenerant gas may be passed in the reverse direction from that of the absorption step. Such adsorption-regeneration sequences are commonly used in commercial processes and are readily amenable to automatic (computer-controlled) sequencing. Therefore, fixed adsorption beds have a significant advantage over other removal processes.

In accordance with the present invention, a method is provided for selectively separating hydrogen chloride from a gas mixture containing carbon dioxide, hydrogen chloride and other gas components which comprises contacting the gas mixture with a cross-linked, water-insoluble polymer of N-glycidylpiperazine at a temperature between about $-10°$ and $100°$ C.

It has been found that, whereas the method of the present invention is highly successful in the selective separation of hydrogen chloride from the gas mixtures involved, it is also selective in the separation of sulfur dioxide which is often found in industrial gases as an impurity. The method of the invention will simultaneously effect the separation of both hydrogen chloride and sulfur dioxide if sulfur dioxide impurities are present in addition to hydrogen chloride impurities.

It has been found impossible to generalize with respect to which impurities, in addition to hydrogen chloride, can be removed from gas mixtures by the practice of the method of the present invention. For example, it is known that, in addition to hydrogen chloride separation, sulfur dioxide separation is also possible. Still further, it has been found that hydrogen sulfide separation, as well as the separation of many other impurities normally found in industrial hydrocarbon gas mixtures, are incapable of separation by the method of the present invention, e.g., carbonyl sulfide, hydrogen cyanide, hydrogen, carbon monoxide, synthesis gases and the like.

Accordingly, the hydrogen chloride separation method of the present invention is quite unpredictable as to use in separation of other gaseous impurities commonly found in industrial gas streams.

The method utilizing this invention consists of one or more fixed tubular adsorption beds which may be operated in any one of a number of series/parallel configurations. Adsorption may be carried out over a relatively wide temperature range, from about $-10°$ to $100°$ C. However, lower temperatures are preferred, and the most preferred temperature may be about $10°-35°$ C. (ambient). If adsorption is carried out at higher temperatures, the adsorptive capacity of the bed is reduced. This occurs since capacity is determined by the difference in adsorption equilibrium of hydrogen chloride between the adsorption and regeneration temperatures. That is, if adsorption is carried out at about $25°$ C. to saturation, some of the hydrogen chloride may be desorbed by raising the temperature to about $100°$ C. If the temperature is increased further, more hydrogen chloride will desorb, thus enhancing the degree to which the adsorbent has been regenerated.

Adsorption may be carried out at all pressures prevalent in present gas processing practice. Higher pressures are favored since, in general, adsorbent capacity would tend to increase with increasing pressure.

Space velocity is a third operating variable of significance. As employed herein, the term "space velocity" is defined as:

$$\text{Space velocity} = \frac{\text{Volumetric gas rate at standard conditions}}{\text{Volume of adsorbent}}.$$

It has the units of $hr^{-1}$ and is a measure of the contact time between the gas and adsorbent. Higher space velocities tend to reduce adsorptive capacity. As employed with the method of the present invention, a range of 1000 to 10,000 $hr^{-1}$ may be used in practice, with a preferred range of 100 to 4000 $hr^{-1}$.

About 60 cc of cross-linked, N-glycidylpiperazine polymer (21.0 gm) were charged to 1-inch diameter tubular reactors equipped with resistance heaters encased in ceramic insulating shells.

The adsorbent bed was purged with nitrogen before switching to synthesis gas containing hydrogen chloride as an impurity.

Analyses were obtained by scrubbing the feed or reactor effluent in deionized distilled water, for a specified time at a rate of 137 cc/min., and measuring the absorbed hydrogen chloride with an Orion selective ion electrode. The latter was calibrated with hydrochloric acid of various strengths. Because of time constraints, the effluent gas was scrubbed for no more than 2 hours. Thus the measured hydrogen chloride concentration represents a time-averaged value for the two-hour period. Since the output of the ion electrode was in 1 mv increments, this converts to a detection limit of about 0.45 ppm. However, an observed ion electrode output fluctuating between 0 and 1 mv would imply a chloride concentration of about 0.25 ppm.

At the end of an experiment, the beds were heated to $150°$ to $200°$ C. and purged with nitrogen, then maintained under a nitrogen atmosphere until the next experiment.

Physical properties of two representative adsorbent batches are set forth in Table II.

The use of N-glycidylpiperazine polymer for the selective removal of hydrogen chloride may be illustrated by the following examples. (See also as reported in tabular form in Table I.)

EXAMPLE 1

About 20 ppmv of HCl in a synthesis gas carrier was passed at a space velocity of 1200 (standard conditions) over a bed of the absorbent maintained at 100 psig and ambient temperature ($34°$ C.). After 1 to 2 hours the measured HCl concentration in the effluent gas was 1.1 ppmv.

EXAMPLE 2

Synthesis gas containing about 20 ppmv of HCl and 20 ppmv of $SO_2$ was passed at a space velocity of 1200 $hr^{-1}$ (standard conditions) over a bed of N-glycidylpiperazine polymer maintained at 50 psig and ambient temperature ($34°$ C.). After 6.5 hours there was no detectable HCl in the reactor effluent; the measured $SO_2$ concentration was 1.5 ppmv.

Gas flow over the bed was continued and after about 28 hours, the effluent gas showed HCl and $SO_2$ concentrations of 6.9 and 6.1 ppmv respectively.

EXAMPLE 3

A synthesis gas stream, containing about 20 and 40 ppmv of HCl and $SO_2$, respectively, was passed over the adsorbent maintained at 100 psig and ambient temperature. At the end of 4.5 hours, the concentrations of HCl and $SO_2$ measured in the effluent were 4.1 and 2.4 ppmv respectively.

EXAMPLE 4

A synthesis gas stream containing about 54 ppm $H_2S$ was passed over the adsorbent maintained at 100 psig and ambient temperature ($19°$ C.). At the end of about 5 hours the concentration of $H_2S$ in the effluent was 52 ppmv.

EXAMPLE 5

A synthesis gas stream containing about 20 ppmv HCl and 20 ppmv of $H_2S$ was passed over the adsorbent maintained at 100 psig and ambient temperature (30° C.). At the end of about 4 hours, the concentrations of HCl and $H_2S$, measured in the effluent, were less than 0.1 and about 20 ppmv, respectively.

As employed herein, the following terms have the following meanings:

| | |
|---|---|
| Synthesis Gas | A mixture of hydrogen and carbon monoxide. |
| Space Velocity | A measure of the volumetric flow of gas per unit volume of adsorbent. It has units of volumetric gas rate/volume of adsorbent |
| ppmv | Unit of concentration. Amount of species in volume or moles per million ($10^6$) corresponding units of carrier. |

TABLE II
PHYSICAL PROPERTIES OF ADSORBENT

| | Batch No. 1 | Batch No. 2 |
|---|---|---|
| Form | Granules | Granules |
| Mesh Size | 8–25 | 6–25 |
| Bulk Density, lbs/cu. ft. | 24.2 | 21.2 |
| Particle Density | 40–42 | 39–41 |
| Composition, % | | |
| N-Glycidylpiperazine polymer | 90 | 90 |
| Alumina | 10 | 10 |
| Volatiles (Weight loss after 24 hrs at 120° C. under vacuum; probable moisture) | 1.26 | 2.9 |
| Swell Ratio in Water (Volume) | 3.5:1 | 13:1 |
| Shrink Ratio (Volume) (After drying at 110 to 120° C. under atmospheric pressure) | .95:1 | .5:1 |

As may be readily seen from the data of the examples, it is not possible to predict with accuracy the operability of the method of the invention to the selective separation of a specific gaseous mixture component along with hydrogen chloride. The method of the invention readily co-separates sulfur dioxide with hydrogen chloride, while it unexpectedly does not co-separate the more closely structured hydrogen sulfide with hydrogen chloride.

What is claimed is:

TABLE I
REMOVAL OVER ADSORBENT

| Example | Space Velocity $v/v_{bed}$, hr | Pressure Psig | Temperature °C. | Feed Concentration, ppm $H_2S$ | HCl | $SO_2$ | Reactor Exit Concentration, ppm Time, Hrs | HCl | Time, Hrs | $SO_2$ | Time, Hrs | $H_2S$ |
|---|---|---|---|---|---|---|---|---|---|---|---|---|
| 1 | 1200 | 100 | 34 | — | 19.7 | — | 1 to 2 | 1.1 | — | — | — | — |
| 2 | 1200 | 50 | 34 | — | 19.7 | 20.5 | 6.5 | 0 | 6.5 | 1.5 | — | — |
| | (Gas flow over beds maintained overnight) | | | | | | 27.5 | 6.9 | 28.5 | 6.1 | — | — |
| 3 | 1200 | 100 | 34 | — | 19.7 | 40 | 4.5 | 4.1 | 5.5 | 2.4 | — | — |
| 4 | 1200 | 100 | 19 | 54 | — | — | — | — | — | ~5 | 52 | |
| 5 | 1200 | 100 | 30 | 20 | 20 | — | 4 | <0.1 | — | ~4 | 20 | |

Note:
Adsorbent: 60 cc of adsorbent in a 2.5 cm diameter tubular reactor

1. The method for the selective separation of hydrogen chloride from a gaseous mixture containing hydrogen chloride, carbon dioxide and other gaseous impurities which comprises contacting said gaseous mixture with a cross-linked, water-insoluble polymer of N-glycidylpiperazine at a temperature between about −10° and 100° C.

2. The method in accordance with claim 1, wherein carbon dioxide is the major component of said gaseous mixture.

3. The method in accordance with claim 1, wherein gaseous hydrocarbon is the major component of said gaseous mixture.

* * * * *

UNITED STATES PATENT AND TRADEMARK OFFICE
CERTIFICATE OF CORRECTION

PATENT NO. : 4,296,078
DATED : October 20, 1981
INVENTOR(S) : Cyril B. Tellis

It is certified that error appears in the above—identified patent and that said Letters Patent is hereby corrected as shown below:

On the abstract page the following information should be added:

Assignee: Union Carbide Corporation, New York, N. Y.

Attorney, Agent, or Firm - Gerald R. O'Brien, Jr.

Column 2, Line 48 - Change "go" to----to.

Column 4, Line 37 - Change "absorbent" to----adsorbent.

Signed and Sealed this

Fifth Day of October 1982

[SEAL]

Attest:

GERALD J. MOSSINGHOFF

Attesting Officer　　Commissioner of Patents and Trademarks